(12) United States Patent
Shih Shih et al.

(10) Patent No.: US 11,927,248 B1
(45) Date of Patent: Mar. 12, 2024

(54) ROTARY APPARATUS

(71) Applicant: TOYO AUTOMATION CO., LTD., Tainan (TW)

(72) Inventors: Lei Shih Shih, Tainan (TW); Hsiang-Wei Chen, Tainan (TW); Kun-Cheng Tseng, Tainan (TW)

(73) Assignee: TOYO AUTOMATION CO., LTD., Tainan (TW)

( * ) Notice: Subject to any disclaimer, the term of this patent is extended or adjusted under 35 U.S.C. 154(b) by 0 days.

(21) Appl. No.: 18/184,739

(22) Filed: Mar. 16, 2023

(30) Foreign Application Priority Data

Jan. 3, 2023 (TW) .................................. 112100135

(51) Int. Cl.
  *F16H 55/24* (2006.01)
  *F16H 1/16* (2006.01)
  *F16H 57/12* (2006.01)

(52) U.S. Cl.
  CPC ............... *F16H 1/16* (2013.01); *F16H 55/24* (2013.01); *F16H 2057/125* (2013.01)

(58) Field of Classification Search
  CPC ....... F16H 1/16; F16H 55/24; F16H 2057/125
  See application file for complete search history.

(56) References Cited

U.S. PATENT DOCUMENTS

| | | | | |
|---|---|---|---|---|
| 5,834,662 | A * | 11/1998 | Stoll | B66C 23/84 74/411 |
| 8,727,065 | B2 * | 5/2014 | Kuroumaru | F16H 55/24 180/443 |
| 9,200,700 | B2 * | 12/2015 | Kessler | F16H 57/022 |
| 9,509,248 | B2 * | 11/2016 | Wu | F16H 1/16 |
| 10,533,652 | B2 * | 1/2020 | Wasser | F16H 1/16 |
| 2014/0208895 | A1 * | 7/2014 | Maffeis | B23Q 16/10 74/813 R |

* cited by examiner

*Primary Examiner* — Bobby Rushing, Jr.
(74) *Attorney, Agent, or Firm* — MLO, a professional corp.

(57) ABSTRACT

A rotary apparatus includes a casing having a top sunk opening and an axial hole that are coaxially with each other along an axial line. A top adjusting disc unit is fixed in the top sunk opening, and has a top inner surrounding surface and a top outer surrounding surface. A top inner hole of the top inner surrounding surface extends along a central line parallel to and offset from the axial line. The top outer surrounding surface is non-coaxial with the top inner surrounding wall. A passive gear unit is disposed in the axial hole, and is driven by an active gear unit that is driven by a drive unit in the casing. The passive gear unit has an output shaft extending along the central line. A top bearing is clamped between the top support portion and the top inner surrounding surface of the top adjusting disc unit.

10 Claims, 12 Drawing Sheets

US 11,927,248 B1

ROTARY APPARATUS

CROSS-REFERENCE TO RELATED APPLICATION

This application claims priority to Taiwanese Patent Application No. 112100135, filed on Jan. 3, 2023.

FIELD

The disclosure relates to a machining apparatus, and more particularly to a rotary apparatus.

BACKGROUND

FIGS. 1 and 2 illustrate an existing rotary apparatus (e.g., a rotary table manufactured by SMC Corporation) that is widely used in industry for transmission of rotary motion and that is different from a sliding table apparatus used for transmission of linear motion. The rotary apparatus is composed of a power source 1 (e.g., a stepper motor), a power transmission mechanism 2, two bearings 3, and a rotary output component 4. The power transmission mechanism 2 has a belt pulley assembly 201 and a gear set 202 (including a worm shaft and a worm gear). The power source 1 drives the belt pulley assembly 201 to actuate the gear set 202 so that the rotary output component 4 may output rotary motion.

However, the worm shaft and the worm gear may have a relatively large backlash due to machining or assembling. In addition, the aforesaid rotary apparatus is not designed to provide for backlash adjustment. Therefore, there exists a backlash value of ±0.3° or smaller in the performance data of the rotary apparatus. In other words, the backlash value will inevitably affect precision of the rotary apparatus.

Furthermore, based on the rotary apparatus having the stepper motor, the gear set usually serves as a force transmitting mechanism. When a lower speed-reduction ratio is required to be relatively low, a spur or helical gear set may be used. When the lower speed-reduction ratio is required to be relatively high, a hypoid gear set or a worm shaft and worm gear set may be used. No matter what type of the gear set is selected to be used, the problem of adjusting backlash still exists. If the backlash is relatively small, abrasion of gear components is aggravated, which may shorten the service life of the rotary apparatus. If the backlash is relatively large, the precision of the rotary apparatus is adversely affected. Hence, being able to precisely adjust the backlash becomes an issue to be resolved for the rotary apparatus.

SUMMARY

Therefore, an object of the disclosure is to provide a rotary apparatus that can alleviate a drawback of the prior art.

According to the disclosure, a rotary apparatus includes a base unit, a top adjusting disc unit, a drive unit, a gear mechanism, and a bearing unit.

The base unit includes a casing defining a receiving space and having a top surface, a top sunk opening, and an axial hole. The top sunk opening opens upwardly via the top surface. The axial hole communicates with the top sunk opening and the receiving space. The said top sunk opening and the axial hole extend coaxially along an axial line.

The top adjusting disc unit is rotatably fixed in the top sunk opening, and has a top inner surrounding surface and a top outer surrounding surface. The top inner surrounding surface defines a top inner hole that extends along a central line. The central line is parallel to and offset from the axial line. The top outer surrounding surface surrounds the top inner surrounding surface, extends along the axial line, and is non-coaxial with the top inner surrounding wall.

The drive unit is mounted in the base unit.

The gear mechanism is mounted in the base unit, and has an active gear unit and a passive gear unit. The active gear unit is driven rotatably by the drive unit. The passive gear unit is disposed in the axial hole, and is connected to and driven rotatably by the active gear unit. The passive gear unit has an output shaft that extends along the central line. The output shaft has an output end portion that extends outwardly from the top sunk opening and the axial hole, and a top support portion that is connected to the output end.

The bearing unit includes a top bearing that is sleeved on the top support portion of the output shaft, and that is clamped between the top support portion and the top inner surrounding surface of the top adjusting disc unit.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
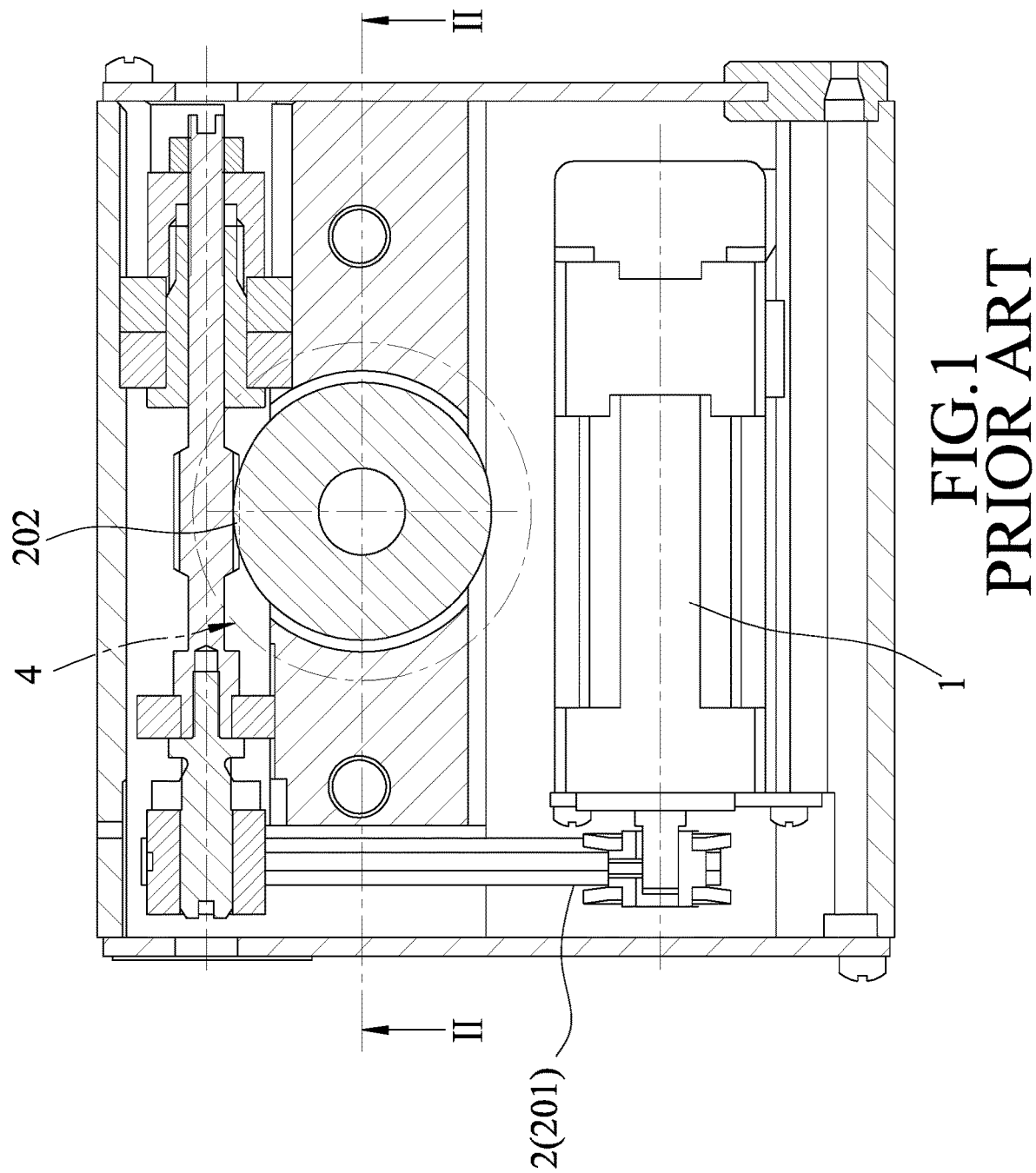
FIG. 1 is a schematic sectional view illustrating an existing rotary apparatus.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
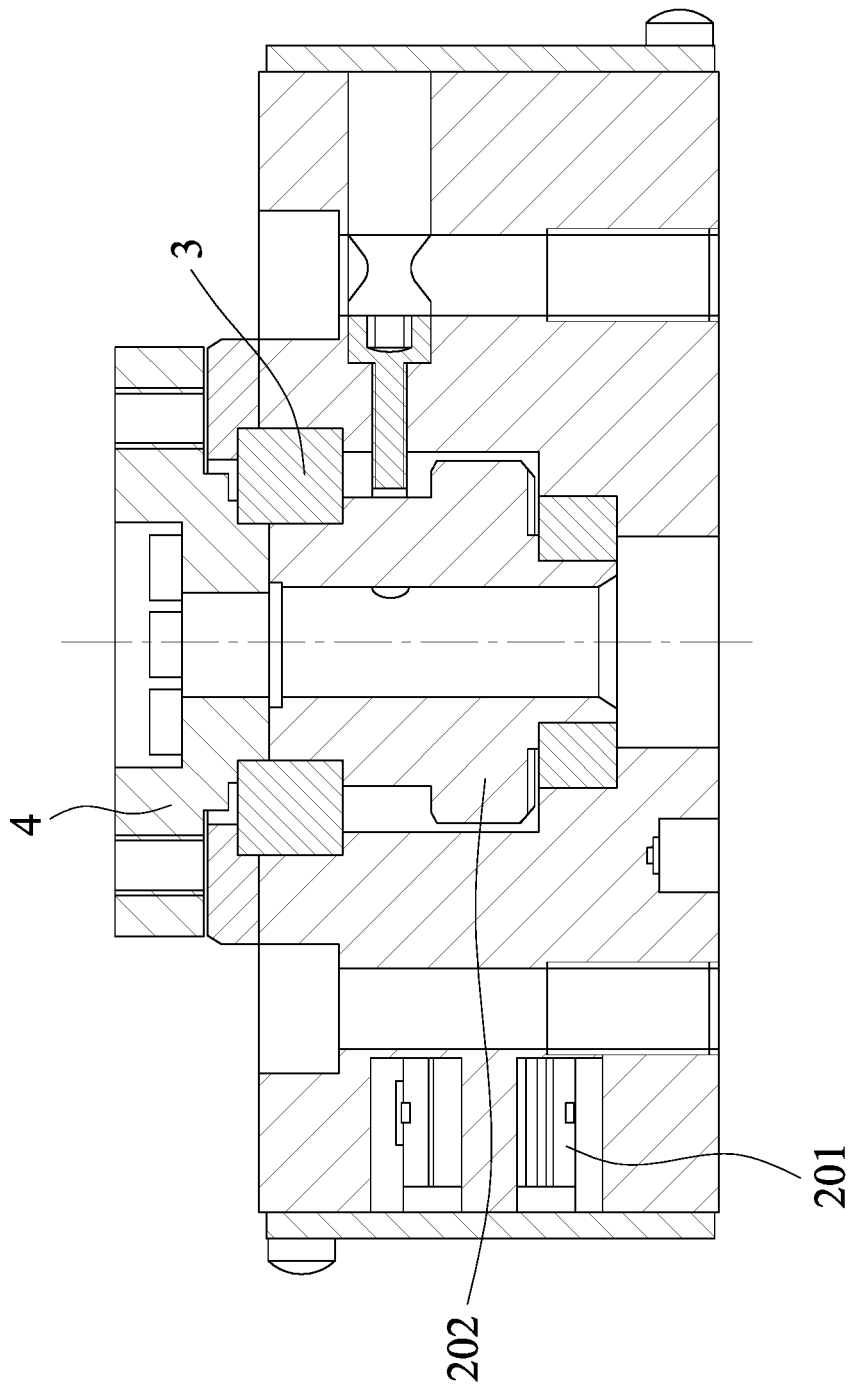
FIG. 2 is a schematic sectional view taken along line II-II of FIG. 1.
Figure 3:
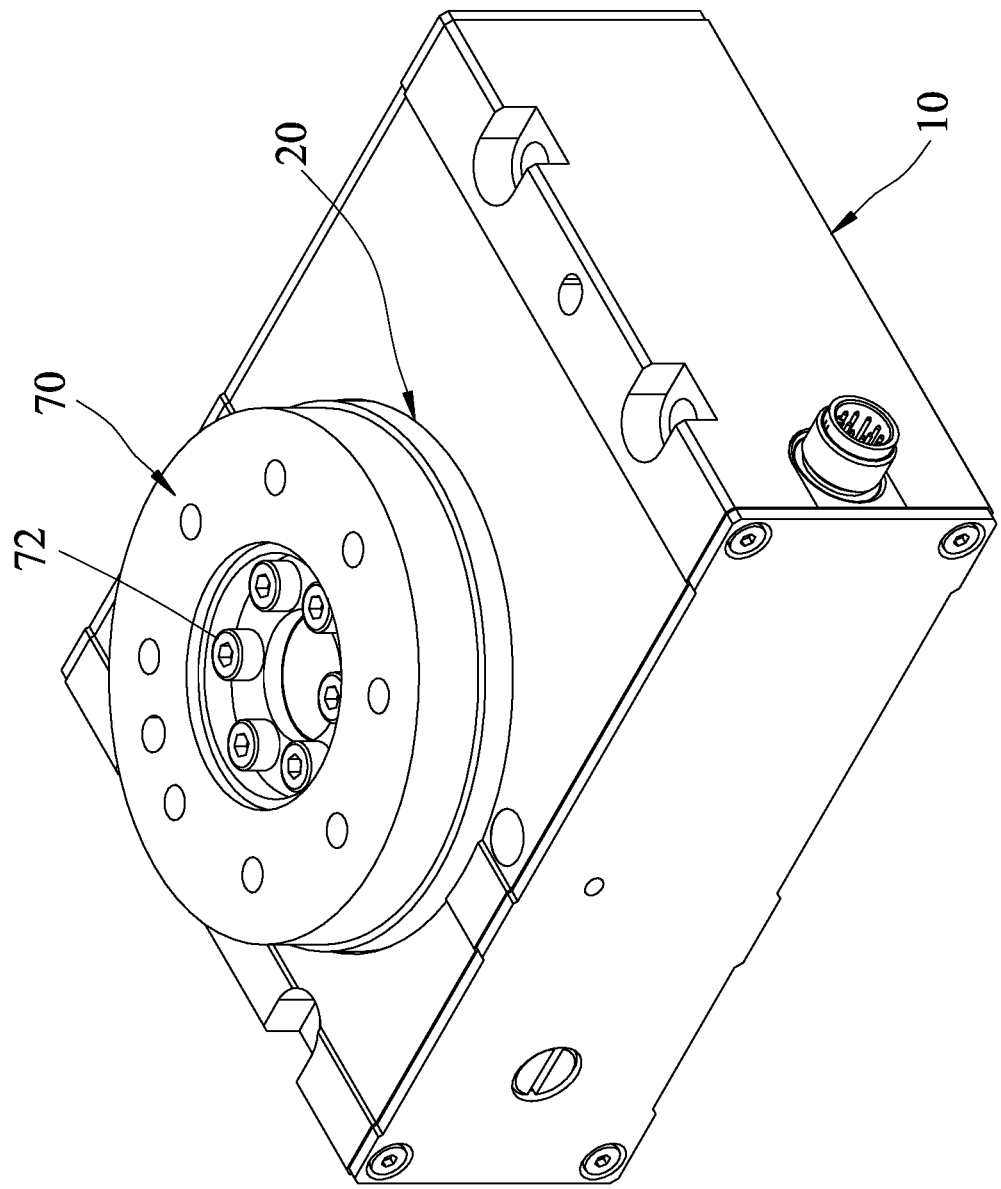
FIG. 3 is a prospective view illustrating a rotary apparatus according to an embodiment of the disclosure.

Referring to FIGS. 1 to 3, a rotary apparatus according to an embodiment of the disclosure is adapted to be mounted on a sliding table assembly (not shown, such as the sliding table assembly disclosed in the applicant's Taiwanese Patent No. TW1776605B) that is to be linearly moved. The rotary apparatus of the disclosure is capable of outputting rotational power. The rotary apparatus includes a base unit 10, a top adjusting disc unit 20, a bottom adjusting disc unit 20', a drive unit 30, a gear mechanism 40, a bearing unit 50, a plurality of top fasteners 60, a bottom fastener 60', and a carrier unit 70.

Figure 4:
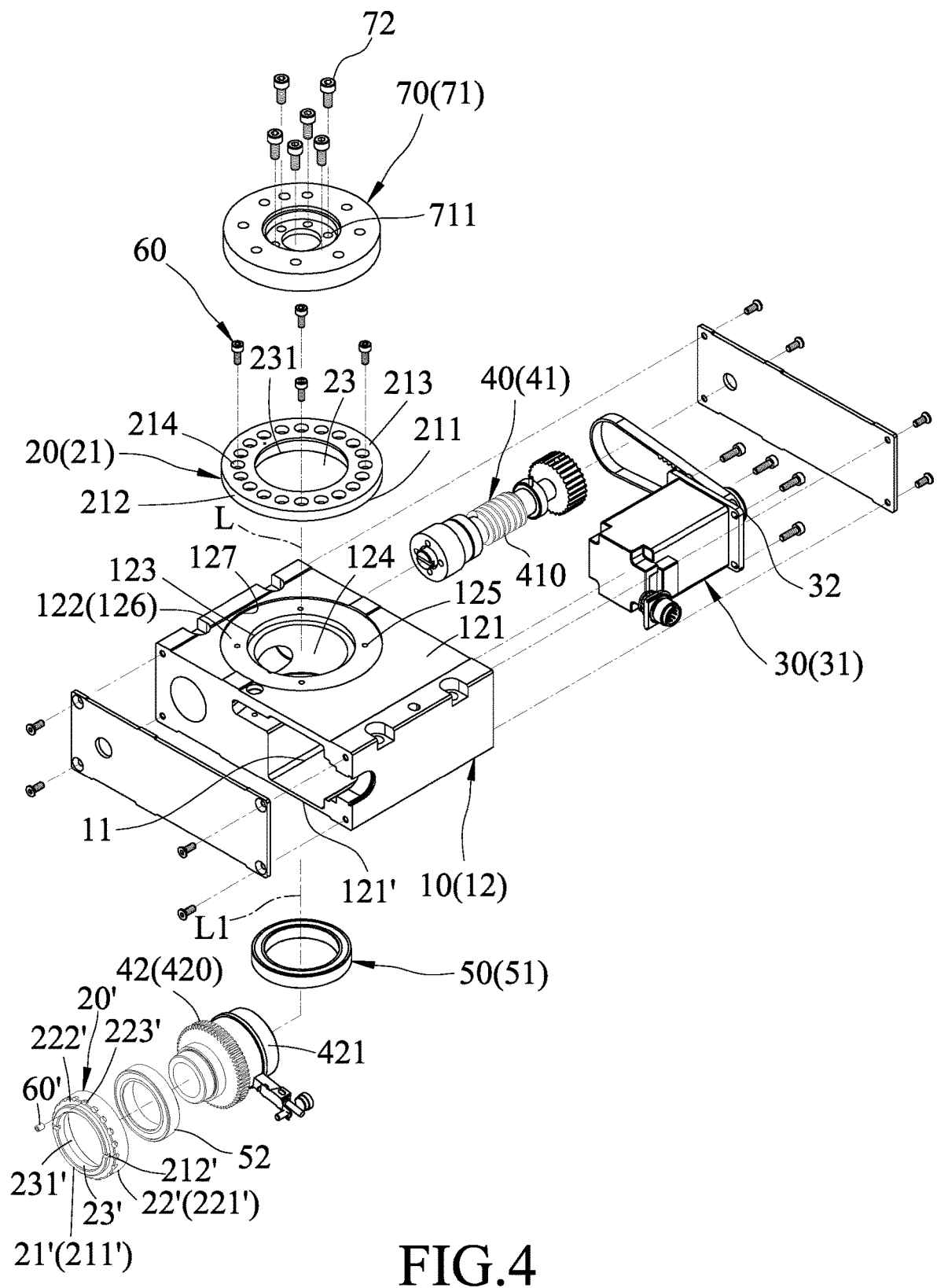
FIG. 4 is an exploded perspective view of the embodiment, illustrating a base unit, a top adjusting disc unit, a bottom adjusting disc unit, a drive unit, a gear mechanism, a bearing unit, a plurality of top fasteners, a bottom fastener, and a carrier unit of the rotary apparatus.
Figure 7:
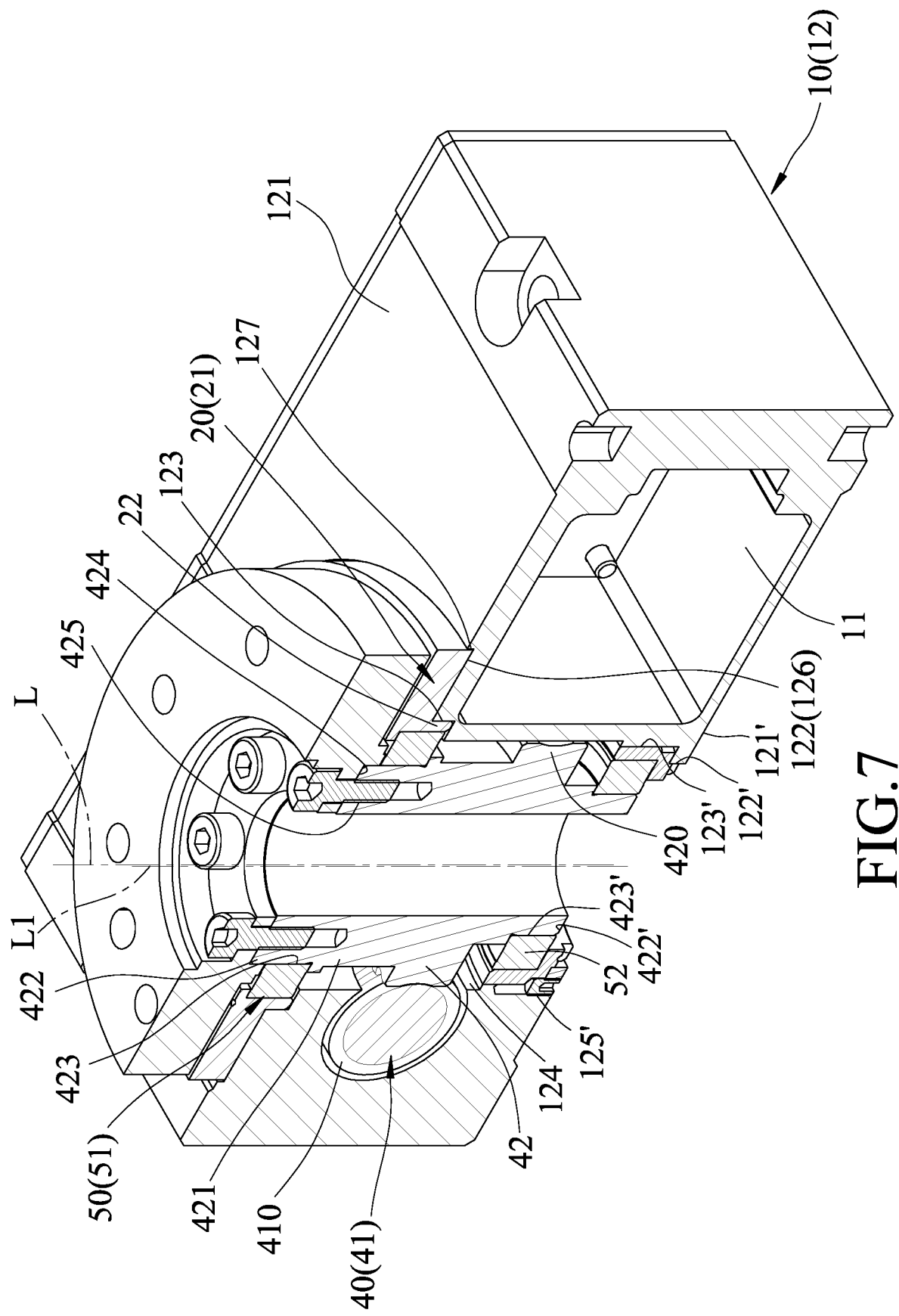
FIG. 7 is a partly sectional perspective view of the embodiment, illustrating the rotary apparatus in an assembled state.
Figure 8:
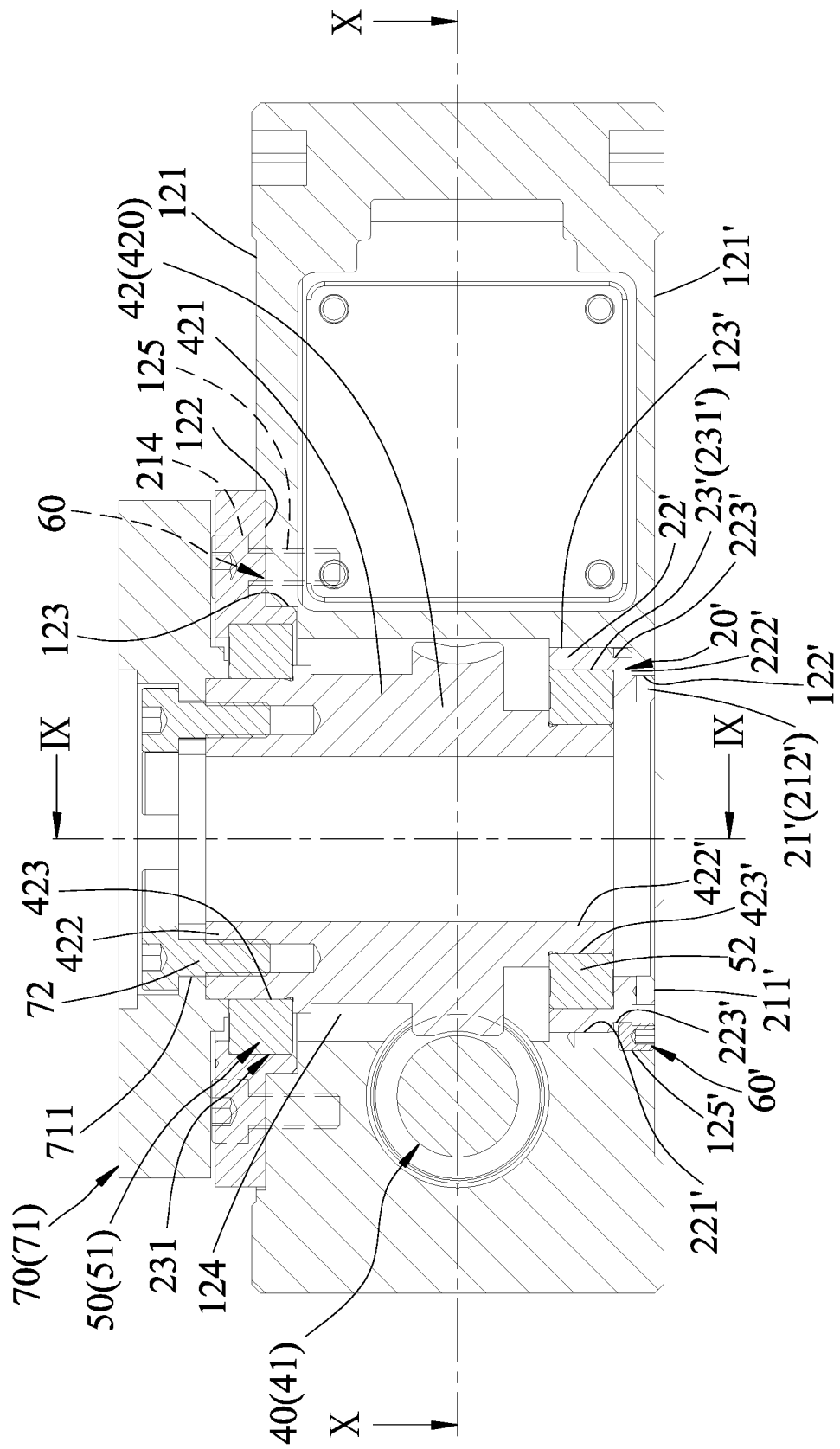
FIG. 8 is a schematic sectional view, illustrating the rotary apparatus of the embodiment.
Figure 9:
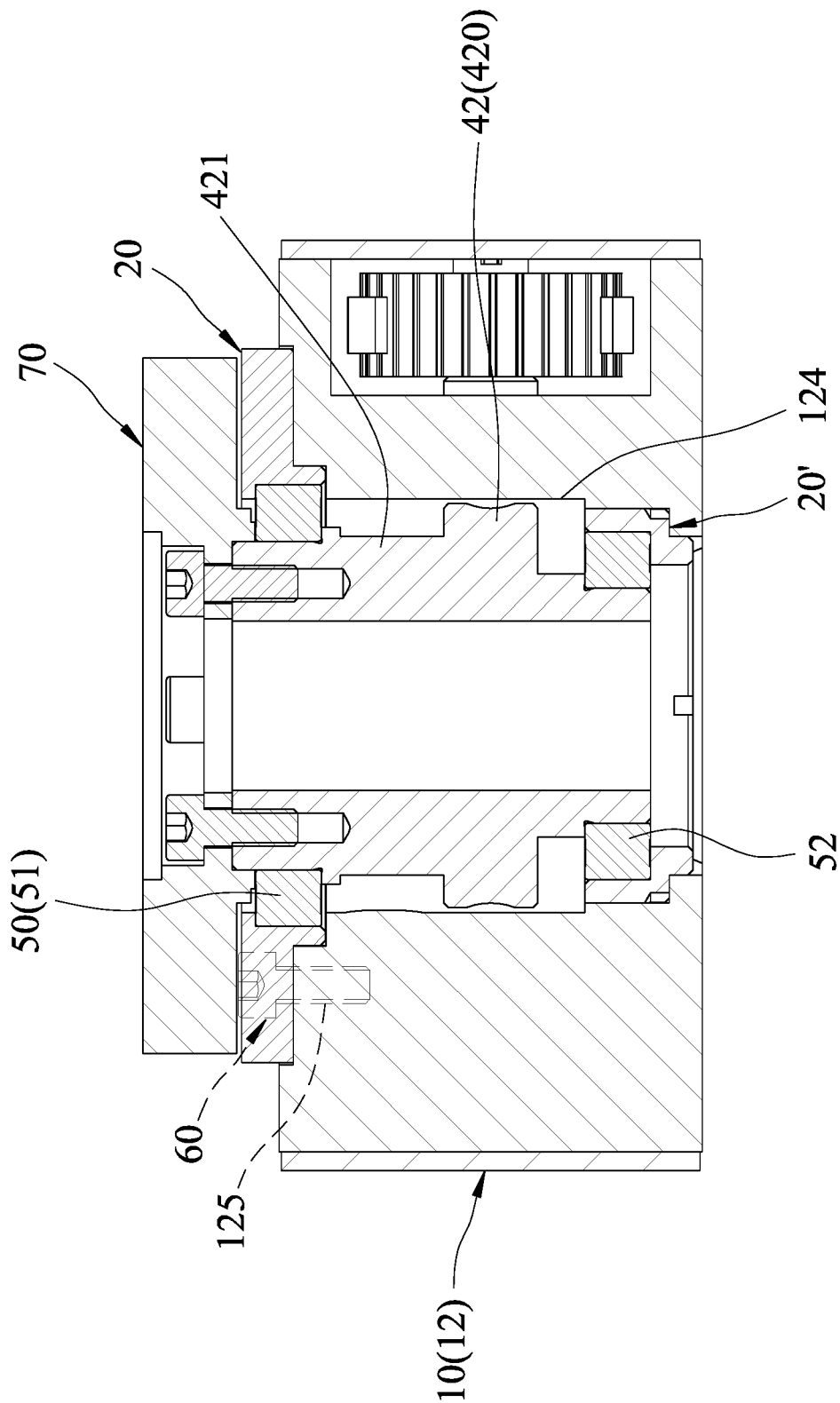
FIG. 9 is a schematic sectional view taken along line IX-IX of FIG. 8.

Referring to FIGS. 7 to 9 in combination with FIG. 4, the base unit 10 includes a casing 12 that defines a receiving space 11. The casing 12 has a top surface 121, a top recessed portion 122, a top sunk opening 123, an axial hole 124, a plurality of top fastening holes 125, a bottom surface 121', a bottom hole 122', a bottom sunk hole 123', and a bottom fastening hole 125'.

The top recessed portion 122 is indented from the top surface 121. The top recessed portion 122 is bounded by a recessed bottom surface 126 that is perpendicular to an axial line (L), and a recessed surrounding surface 127 that is connected between the recessed bottom surface 126 and the top surface 121. The top sunk opening 123 opens upwardly via the top surface 121. The axial hole 124 communicates with the top sunk opening 123 and the receiving space 11. The top sunk opening 123 and the axial hole 124 extend coaxially along the axial line (L). The top sunk opening 123 extends from the top recessed portion 122 to the axial hole 124. The top fastening holes 125 are equi-angularly spaced apart from each other and are disposed around the top sunk opening 123. Furthermore, a diameter of the top recessed portion 122 is greater than a diameter of the top sunk opening 123. The top fastening holes 125 are four in number.

The bottom surface 121' is opposite to the top surface 121 along the axial line (L). The bottom hole 122' extends through the bottom surface 121'. The bottom sunk hole 123' extends from the bottom hole 122' to the axial hole 124. The bottom sunk hole 123' and the axial hole 124 extend along the axial line (L). A diameter of the bottom sunk hole 123' is greater than a diameter of the bottom hole 122'. The bottom fastening hole 125' extends from the bottom surface 121' at an outer side of the bottom hole 122' with respect to the axial line (L), and extends to the bottom sunk hole 123'. The axial hole 124 communicates with the top sunk opening 123, the bottom sunk hole 123', and the receiving space 11. The top recessed portion 122, the top sunk opening 123, the bottom hole 122', the bottom sunk hole 123', and the axial hole 124 are concentric with each other along the axial line (L).

Figure 5:
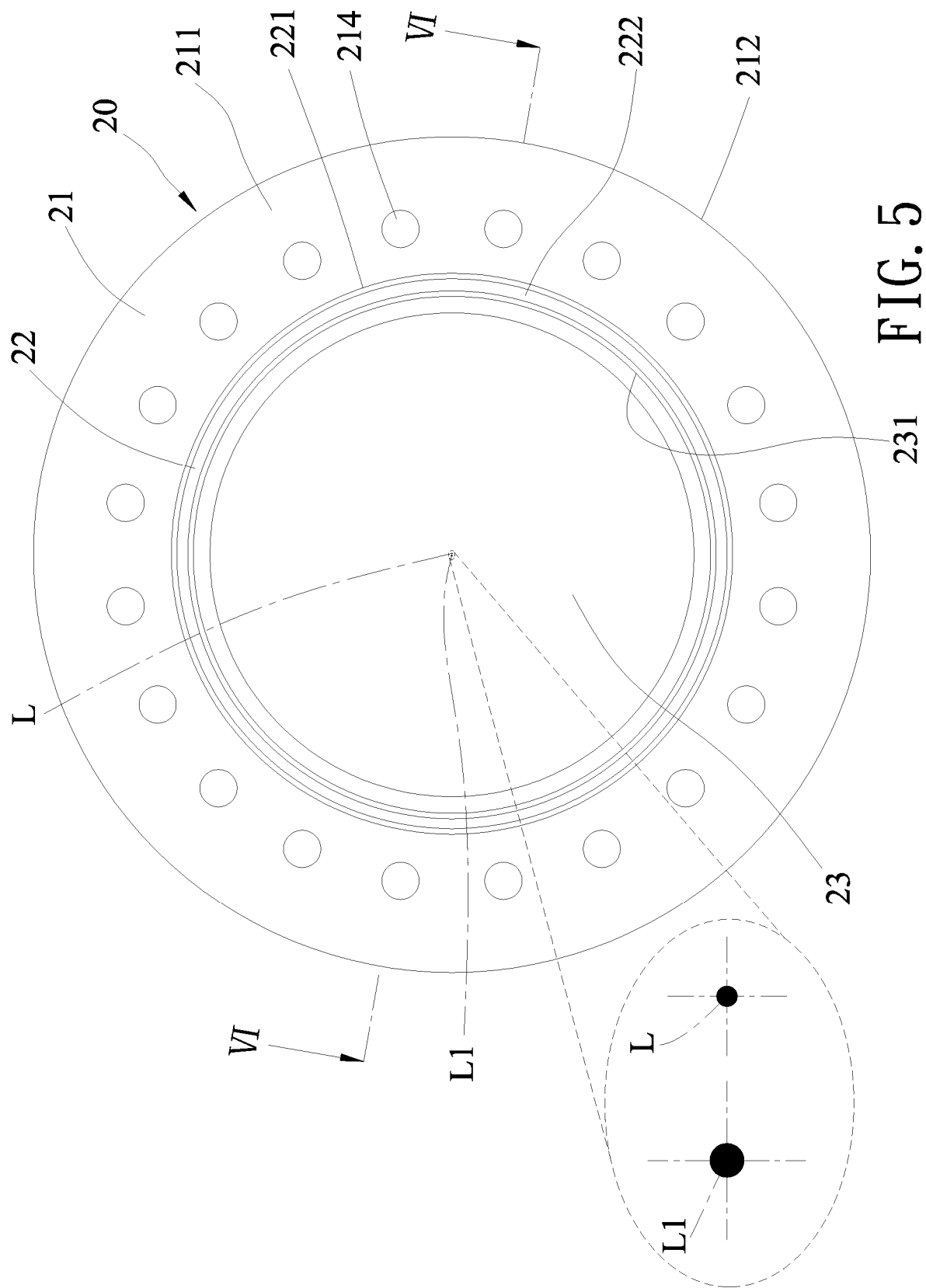
FIG. 5 is a bottom view of the embodiment, illustrating the top adjusting disc unit of the rotary apparatus.
Figure 6:
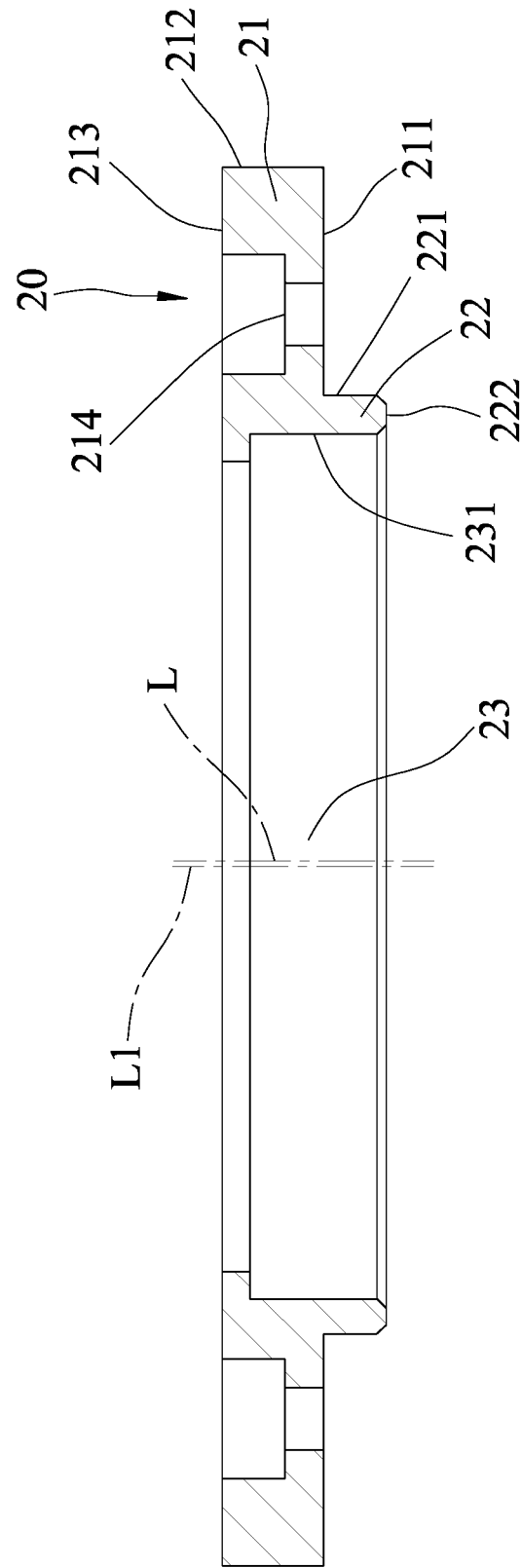
FIG. 6 is a schematic sectional view of the embodiment, illustrating the top adjusting disc unit of the rotary apparatus.

Referring to FIGS. 5 and 6 in combination with FIGS. 3, 4, 7, and 9, the top adjusting disc unit 20 is rotatably fixed in the top sunk opening 123 of the casing 12. The top adjusting disc unit 20 has a top inner surrounding surface 231 and a top outer surrounding surface 221. The top inner surface 231 defines a top inner hole 23 that extends along a central line (L1). The central line (L1) is parallel to and offset from the axial line (L1). An offset distance between the central line (L1) and the axial line (L) ranges from 0.1 mm to 0.4 mm. The top outer surrounding surface 221 surrounds the top inner surrounding surface 231, extends along the axial line (L), and is non-coaxial with the top inner surrounding wall 231.

In this embodiment, the top adjusting disc unit 20 includes a top disc member 21 and a top rotary member 22. The top disc member 21 is disposed in the top recessed portion 122, and has a shoulder surface 211, a peripheral surrounding surface 212, a top end surface 213, and a plurality of top adjusting holes 214. The shoulder surface 211 extends transversely and outwardly from the top outer surrounding surface 221, and abuts against the recessed bottom surface 126. The peripheral surrounding surface 212 extends transversely and upwardly from the shoulder surface 211. The top end surface 213 extends transversely and inwardly from the peripheral surrounding surface 212. The top adjusting holes 214 are equi-angularly spaced apart from each other, are disposed around the axial line (L), and extend from the top end surface 213 to the shoulder surface 211. The top adjusting holes 214 are twenty in number. Two adjacent ones of the top adjusting holes 214 are spaced 18 degrees apart. The top rotary member 22 extends downwardly from the top disc member 21 and is disposed in the top sunk opening 123. The top rotary member 22 has a bottom end surface 222 and the top outer surrounding surface 221. The bottom end surface 222 is connected between the top inner surrounding surface 231 and the top outer surrounding surface 221. An inner surface of the top disc member 21 facing the top inner hole 23 and an inner surface of the top rotary member 22 facing the top inner hole 23 cooperatively form the top inner surrounding surface 231. The top inner hole 23 extends through the top disc member 21 and the top rotary member 22.

Referring back to FIGS. 7 to 9 in combination with FIG. 4, the bottom adjusting disc unit 20' is rotatably fixed in the bottom sunk hole 123', and has a bottom disc member 21' and a bottom rotary member 22' that is connected to the bottom disc member 21'. The bottom disc member 21' is disposed in the bottom hole 122', and has a distal end surface 211' and two spaced-apart operating slits 212' that are formed in the distal end surface 211'. The bottom rotary member 22' is disposed in the bottom sunk hole 123', and has a bottom inner surrounding surface 231', a bottom outer surrounding surface 221', a transverse surface 222', and a plurality of bottom adjusting holes 223'. The bottom inner surrounding surface 231' defines a bottom inner hole 23' extending along the central line (L1). The bottom outer surrounding surface 221' surrounds the bottom inner surrounding surface 231', and extends along the axial line (L). The transverse surface 222' is connected transversely to the bottom disc member 21' and the bottom outer surrounding surface 221'. The bottom adjusting holes 223' are disposed around the axial line (L), are equi-angularly spaced apart from each other, and are formed in the transverse surface 222'. The bottom adjusting holes 223' are indented in the bottom outer surrounding surface 221'. The operating slits 212' is adapted to be engaged with a tool (not shown) to drive rotation of the bottom adjusting disc unit 20'. In this embodiment, the bottom adjusting holes 223' are twenty in number. Two adjacent ones of the bottom adjusting holes 223' are spaced 18 degrees apart from each other.

Figure 10:
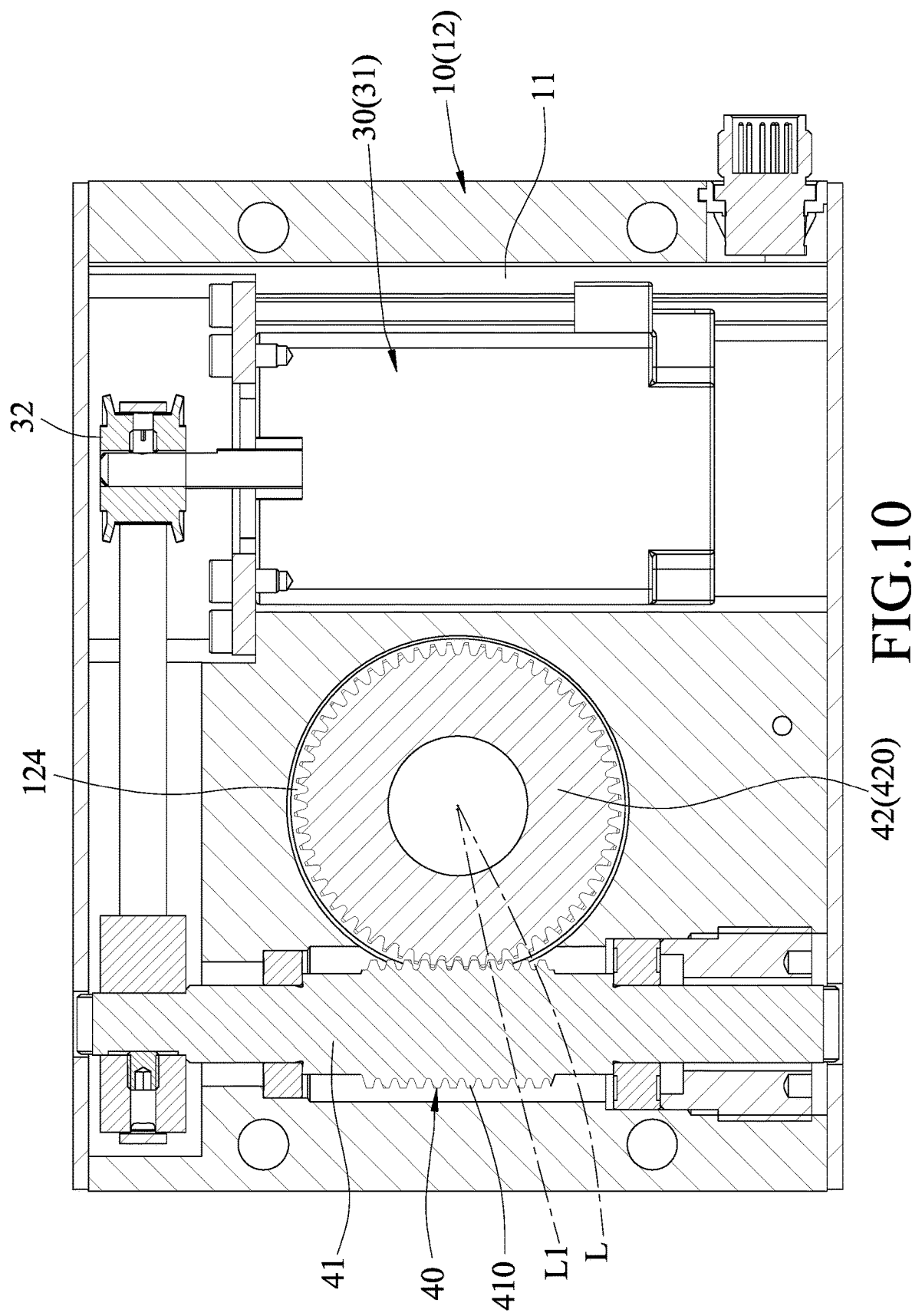
FIG. 10 is a schematic sectional view taken along line X-X of FIG. 8.

As shown in FIG. 10, the drive unit 30 is mounted in the receiving space 11 of the casing 12, and includes a motor 31 and a belt pulley assembly 32 that is connected to and driven by the motor 31.

Figure 11:
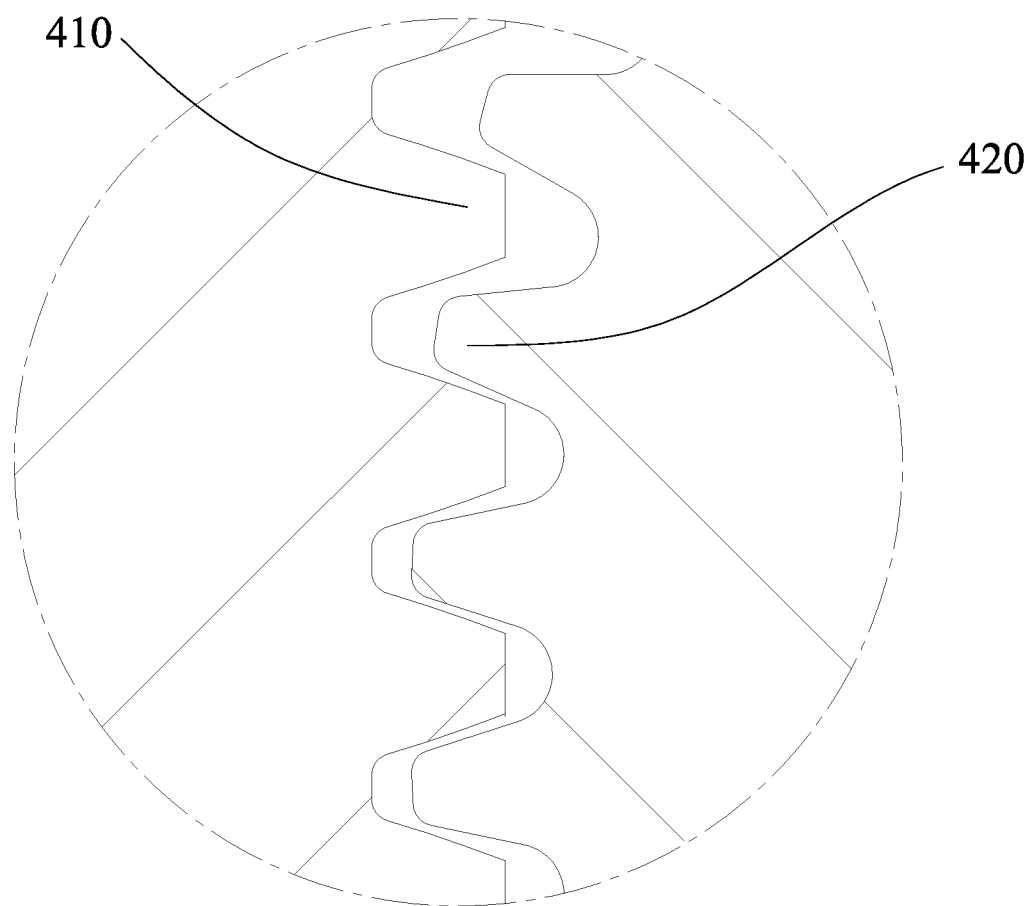
FIG. 11 is an enlarged schematic sectional view of the embodiment, illustrating a backlash between an active gear and a passive gear of the rotary apparatus.

Referring to FIG. 11 in combination with FIGS. 4, 7 to 10, the gear mechanism 40 is mounted in the base unit 10, and has an active gear unit 41 and a passive gear unit 42. The active gear unit 41 is driven rotatably by the belt pulley assembly 32 of the drive unit 30. The active gear unit 41 has an active gear 410. The passive gear unit 42 is disposed in the axial hole 124, and is connected to and driven rotatably by the active gear unit 41. The passive gear unit 42 has an output shaft 421 and a passive gear 420. The output shaft 421 extends along and is rotatable about the central line (L1). The output shaft 421 has an output end portion 422, a top support portion 423, a shaft bottom end portion 422', a bottom support portion 423', and a plurality of threaded holes 425. The output end portion 422 extends outwardly from the top sunk opening 123 and the axial hole 124, and has a top end surface 424. The top support portion 423 is connected to the output end 422. The shaft bottom end portion 422' is opposite to the output end portion 422 along the central line (L1). The bottom support portion 423' is connected to the shaft bottom end portion 422'. The threaded holes 425 are formed in the top end surface 424 of the output end portion 422. The passive gear 420 is fixedly connected to the output shaft 421 and is meshed with the active gear 410. In this embodiment, the active gear 410 is configured as, but not limited to, a worm gear shaft. The passive gear 420 is configured as, but not limited to, a worm wheel.

Referring back to FIGS. 7 to 9, the bearing unit 50 includes a top bearing 51 and a bottom bearing 52. The top bearing 51 is sleeved on the top support portion 423 of the output shaft 421, and is clamped between the top support portion 423 and the top inner surrounding surface 231 of the top adjusting disc unit 20. The bottom bearing 52 is sleeved on the bottom support portion 423' of the output shaft 421, and is clamped between the bottom support portion 423' and the bottom inner surrounding surface 231' of the bottom adjusting disc unit 20'. The bearing unit 50 enables the passive gear unit 42 to rotate smoothly relative to the top adjusting disc unit 20.

Referring back to FIGS. 8 and 9 in combination with FIG. 4, each of the top fasteners 60 extends through a corresponding one of the top adjusting holes 214 of the top adjusting disc unit 20 and is screwed to a corresponding one of the top fastening holes 125 of the casing 12. In this embodiment, the top fasteners 60 are four in number. The number of the top fastening holes 125 of the casing 12 is equal to that of the top fasteners 60, and is smaller than that of the top adjusting holes 214 of the top adjusting disc unit 20.

The bottom fastener 60' extends threadedly into the bottom fastening hole 125' of the casing 12, and is engaged with one of the bottom adjusting holes 223' of the bottom adjusting disc unit 20' to position the bottom adjusting disc unit 20' relative to the base unit 10.

As shown in FIGS. 7 to 9 in combination with FIG. 4, the carrier unit 70 includes a carrier body 71 and a plurality of screws 72. The carrier body 71 has a plurality of through holes 711. The screws 72 respectively extend through the through holes 711, and extend threadedly into threaded holes 425 of the output shaft 421 to secure the carrier body 71 to the output end portion 422 of the output shaft 421. As a result, the carrier body 71 and the top adjusting disc unit 20 are coaxial along the central line (L1), and the top adjusting disc unit 20 is disposed between the carrier body 71 and the base unit 10.

As shown in FIGS. 3, 7 to 11, when the motor 31 of the drive unit 30 is actuated after assembling of the rotary apparatus of the disclosure is completed, the belt pulley assembly 32 drives rotation of the active gear unit 41 so that the active gear unit 41 drives the passive gear unit 42 to rotate together therewith. By virtue of the passive gear 420 being meshed with the active gear 410, the output end portion 422 of the output shaft 421 transmits a rotational force to the carrier body 71 so that the carrier body 71 may output rotational movement.

Figure 12:
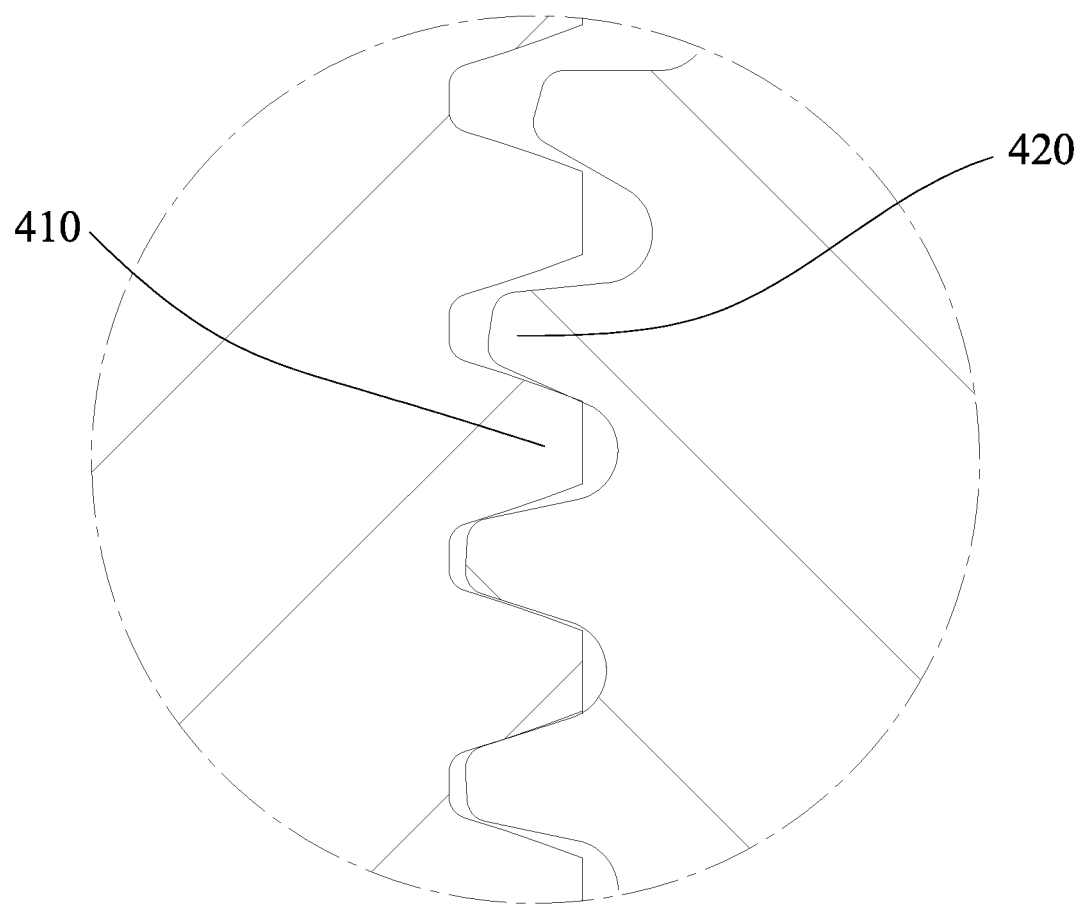
FIG. 12 is a view similar to FIG. 11, but illustrating an adjustment of the backlash between an active gear and a passive gear of the rotary apparatus.

Due to machining, assembling or other reasons, a backlash between the active gear 410 and the passive gear 420 may be relatively great (see FIG. 11). For backlash adjustment, the carrier unit 70 is first removed from the output shaft 421. Subsequently, the top fasteners 60 are removed from the top adjusting disc unit 20, and the bottom fastener 60' is removed from the bottom adjusting disc unit 20'. Afterwards, the top adjusting disc unit 20 and the bottom adjusting disc unit 20' are synchronously rotated by 18 degrees or multiples of 18 degrees in a counterclockwise direction. Regarding the top adjusting disc unit 20, the top outer surrounding surface 221 extending along the axial line (L) is non-coaxial with the top inner surrounding wall 231 defining the top inner hole 23 extending along a central line (L1). Regarding the bottom adjusting disc unit 20', the bottom outer surrounding surface 221' extending along the axial line (L) is non-coaxial with the bottom inner surrounding surface 231' defining the bottom inner hole 23' extending along the central line (L1). Because the top bearing 51 is sleeved on the top support portion 423 of the output shaft 421 and is clamped between the top support portion 423 and the top inner surrounding surface 231 of the top adjusting disc unit 20, and because the bottom bearing 52 is sleeved on the bottom support portion 423' of the output shaft 421 and is clamped between the bottom support portion 423' and the bottom inner surrounding surface 231' of the bottom adjusting disc unit 20', when the top adjusting disc unit 20 and the bottom adjusting disc unit 20' are synchronously rotated, the top inner surrounding wall 231 and the bottom inner surrounding surface 231' drive the output shaft 421 and the passive gear 420 through the top and the bottom bearings 51, 52 to move relative to the active gear 410 so as to adjust the backlash between the active gear 410 and the passive gear 420 (see FIG. 12). After the backlash between the active gear 410 and the passive gear 420 is adjusted, the top adjusting disc unit 20 and the bottom adjusting disc unit 20' are secured to the casing 12 by the top fasteners 60 and the bottom fastener 60', and the carrier body 71 is secured to the output end 422 of the output shaft 421 by the screws 72.

In comparison with the prior art, by virtue of the top adjusting disc unit 20 and the bottom adjusting disc unit 20' being rotatably fixed to the casing 12, synchronously rotating the top adjusting disc unit 20 and the bottom adjusting disc unit 20' may drive movement of the passive gear 420 relative to the active gear 410 through the bearing unit 50 for adjusting the backlash between the active gear 410 and the passive gear 420. After adjusting the backlash, the passive gear 420 and the output shaft 421 are still rotatable about the central line (L1) for outputting the rotational force.

In one example, for the rotary apparatus of the prior art that includes the active gear 410 configured as the worm gear shaft and the passive gear 420 configured as the worm wheel, when m is equal to 1 (m=pitch diameter/the number of teeth), the backlash between the active gear 410 and the passive gear 420 is nonadjustable and may range between 0.08 mm and 0.20 mm. In contrast, according to the rotary apparatus of the disclosure, the backlash between the active gear 410 and the passive gear 420 is adjustable. If the backlash between the active gear 410 and the passive gear 420 is required to be adjusted to fall between 0.02 mm and 0.04 mm for production precision, the offset distance between the central line (L1) and the axial line (L) may range from 0.12 mm to 0.25 mm or more.

In another example, for the rotary apparatus of the prior art that includes the active gear 410 configured as the worm gear shaft and the passive gear 420 configured as the worm wheel, when m is equal to 5, the backlash between the active gear 410 and the passive gear 420 is nonadjustable and may range between 0.15 mm and 0.30 mm. In contrast, because the backlash between the active gear 410 and the passive gear 420 of the rotary apparatus according to the disclosure is adjustable, if the backlash between the active gear 410 and the passive gear 420 is required to be adjusted to fall between 0.05 mm and 0.08 mm for production precision, the offset distance between the central line (L1) and the axial line (L) may range from 0.15 mm to 0.35 mm or more.

In still another example, if both of the active gear 410 and the passive gear 420 included in the rotary apparatus of the prior art are configured as a spur gear member (not shown), when m is equal to 3, the backlash between the active gear 410 and the passive gear 420 may range between 0.18 mm and 0.36 mm. In contrast, if both of the active gear 410 and the passive gear 420 of the rotary apparatus according to the disclosure are configured as the spur gear member, and if the backlash between the active gear 410 and the passive gear 420 is required to be adjusted to fall between 0.03 mm and 0.06 mm for production precision, the offset distance between the central line (L1) and the axial line (L) may range from 0.18 mm to 0.4 mm.

The above-mentioned values are only for reference, and may vary due to machining and design requirements.

It should be noted that, as long as the backlash between the active gear 410 and the passive gear 420 is adjustable, the active gear 410 and the passive gear 420 are not limited to the worm gear shaft and the worm wheel. In addition, the rotary apparatus of the disclosure is not limited to include the top adjusting disc unit 20 and the bottom adjusting disc unit 20' at the same time. Only one or more of the top adjusting disc unit 20 and the bottom adjusting disc unit 20' may be included to be used. The offset distance between the central line (L1) and the axial line (L) is not limited to 0.1 mm and is adjustable.

In summary, the overall structure of the rotary apparatus of the disclosure is simple, and is easy to be manufactured and assembled.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, the one or more features may be singled out and practiced alone without the another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A rotary apparatus comprising:
    a base unit that includes a casing defining a receiving space and having:
        a top surface,
        a top sunk opening that opens upwardly via said top surface, and
        an axial hole that communicates with said top sunk opening and said receiving space, said top sunk opening and said axial hole extending coaxially along an axial line;
    a top adjusting disc unit that is rotatably fixed in said top sunk opening and that has:
        a top inner surrounding surface defining a top inner hole that extends along a central line, the central line being parallel to and offset from the axial line, and
        a top outer surrounding surface surrounding said top inner surrounding surface, extending along the axial line, and being non-coaxial with said top inner surrounding wall;
    a drive unit that is mounted in said base unit;
    a gear mechanism that is mounted in said base unit and that has:
        an active gear unit driven rotatably by said drive unit, and
        a passive gear unit disposed in said axial hole, and connected to and driven rotatably by said active gear unit, said passive gear unit having an output shaft that extends along the central line, said output shaft having an output end portion that extends outwardly from said top sunk opening and said axial hole, and a top support portion that is connected to said output end; and
    a bearing unit that includes a top bearing sleeved on said top support portion of said output shaft and clamped between said top support portion and said top inner surrounding surface of said top adjusting disc unit.

2. The rotary apparatus as claimed in claim 1, wherein:
    said casing further has a plurality of top fastening holes that are equi-angularly spaced apart from each other and that are disposed around said top sunk opening;
    said top adjusting disc unit further has:
        a shoulder surface that extends transversely and outwardly from said top outer surrounding surface,
        a peripheral surrounding surface that extends transversely and upwardly from said shoulder surface,
        a top end surface that extends transversely and inwardly from said peripheral surrounding surface,
        a bottom end surface that is connected between said top inner surrounding surface and said top outer surrounding surface, and
        a plurality of top adjusting holes that are equi-angularly spaced apart from each other, that are disposed around the axial line, and that extend from said top end surface to said shoulder surface; and said rotary apparatus further comprises a plurality of top fasteners, each of said top fasteners extending through a corresponding one of said top adjusting holes and screwed to a corresponding one of said top fastening holes.

3. The rotary apparatus as claimed in claim 2, wherein a number of said top fastening holes of said casing is equal to that of said top fasteners, and is smaller than that of said top adjusting holes of said top adjusting disc unit.

4. The rotary apparatus as claimed in claim 2, wherein:
said top adjusting disc unit includes:
   a top disc member that has said shoulder surface, said peripheral surrounding surface, said top end surface, and said top adjusting holes, and
   a top rotary member that extends downwardly from said top disc member, and that has said bottom end surface and said top outer surrounding surface;
said top inner hole extends through said top disc member and said top rotary member; and
an inner surface of said top disc member facing said top inner hole and an inner surface of said top rotary member facing said top inner hole cooperatively form said top inner surrounding surface.

5. The rotary apparatus as claimed in claim 4, wherein:
said casing further has a top recessed portion that is indented from said top surface;
said top sunk opening extends from said top recessed portion to said axial hole;
said top recessed portion is bounded by a recessed bottom surface that is perpendicular to the axial line, and a recessed surrounding surface that is connected between said recessed bottom surface and said top surface;
said top disc member is disposed in said top recessed portion;
said shoulder surface of said top disc member abuts against said recessed bottom surface; and
said top rotary member is disposed in said top sunk opening.

6. The rotary apparatus as claimed in claim 1, wherein:
said rotary apparatus further comprises a carrier unit that includes a carrier body and a plurality of screws;
said carrier body has a plurality of through holes;
said screws respectively extend through said through holes and extend threadedly into said output end portion of said output shaft to secure said carrier body to said output end portion, said carrier body and said top adjusting disc unit being coaxial along the central line; and
said top adjusting disc unit is disposed between said carrier body and said base unit.

7. The rotary apparatus as claimed in claim 1, wherein:
said active gear unit has an active gear that is configured as a worm gear shaft; and
said passive gear unit further has a passive gear that is fixedly connected to said output shaft, that is configured as a worm wheel and that is meshed with said active gear.

8. The rotary apparatus as claimed in claim 1, wherein an offset distance between the central line and the axial line ranges from 0.1 mm to 0.4 mm.

9. The rotary apparatus as claimed in claim 4, wherein;
said casing further has:
   a bottom surface that is opposite to said top surface along the axial line,
   a bottom hole that extends through said bottom surface,
   a bottom sunk hole that extends from said bottom hole to said axial hole, and
   a bottom fastening hole that extends from said bottom surface at an outer side of said bottom hole with respect to the axial line, and that extends to said bottom sunk hole;
said bottom sunk hole and said axial hole extend along the axial line;
said rotary apparatus further comprises a bottom adjusting disc unit and a bottom fastener;
said bottom adjusting disc unit is rotatably fixed in said bottom sunk hole, and has:
   a bottom inner surrounding surface that defines a bottom inner hole extending along the central line, and
   a bottom outer surrounding surface that surrounds said bottom inner surrounding surface, and that extends along the axial line;
said output shaft further has:
   a shaft bottom end portion that is opposite to said output end portion along the central line, and
   a bottom support portion that is connected to said shaft bottom end portion;
said bearing unit further includes a bottom bearing that is sleeved on said bottom support portion of said output shaft and that is clamped between said bottom support portion and said bottom inner surrounding surface of said bottom adjusting disc unit; and
said bottom fastener extends threadedly into said bottom fastening hole to position said bottom adjusting disc unit relative to said base unit.

10. The rotary apparatus as claimed in claim 9, wherein:
said bottom adjusting unit includes:
   a bottom disc member that is disposed in said bottom hole, and
   a bottom rotary member that is connected to said bottom disc member and that is disposed in said bottom sunk hole;
said bottom disc member has a distal end surface and two spaced-apart operating slits that are formed in said distal end surface, said operating slits being adapted to be engaged with a tool to drive rotation of said bottom adjusting disc unit;
said bottom rotary member has said bottom inner surrounding surface and said bottom outer surrounding surface, said bottom rotary member further having a transverse surface that is connected transversely to said bottom disc member and said bottom outer surrounding surface, and a plurality of bottom adjusting holes that are disposed around the axial line, that are equi-angularly spaced apart from each other, and that are formed in said transverse surface; and
said bottom fastener is engaged with one of said bottom adjusting holes.

* * * * *